United States Patent
Schwörer

[11] Patent Number: 6,027,276
[45] Date of Patent: Feb. 22, 2000

[54] SCAFFOLDING NODE

[75] Inventor: Artur Schwörer, Senden, Germany

[73] Assignee: Peri GmbH, Weissenhorn, Germany

[21] Appl. No.: 09/051,851

[22] PCT Filed: Jan. 22, 1997

[86] PCT No.: PCT/DE97/00100

§ 371 Date: Apr. 22, 1998

§ 102(e) Date: Apr. 22, 1998

[87] PCT Pub. No.: WO97/27372

PCT Pub. Date: Jul. 31, 1997

[30] Foreign Application Priority Data

Jan. 26, 1996 [DE] Germany ............................ 196 02 737

[51] Int. Cl.[7] .................................................. E04G 1/14
[52] U.S. Cl. ...................... 403/49; 403/246; 182/186.8; 182/179.1
[58] Field of Search .............................. 403/49, 246, 256, 403/174, 178, 190, 187; 211/182; 182/186.7, 186.8, 178.5, 178.6, 177.1

[56] References Cited

U.S. PATENT DOCUMENTS

| | | | |
|---|---|---|---|
| 4,273,463 | 6/1981 | Dobersch | 403/246 |
| 4,405,254 | 9/1983 | Tooley | 403/49 X |
| 4,595,077 | 6/1986 | Buttgereit | 403/49 X |
| 5,411,113 | 5/1995 | Lubinski | 403/49 X |
| 5,605,204 | 2/1997 | Ausejo | 403/246 X |

FOREIGN PATENT DOCUMENTS

| | | |
|---|---|---|
| 2483994 | 12/1981 | France . |
| 8535982 | 3/1986 | Germany . |
| 3800169 | 6/1989 | Germany . |
| 1474020 | 5/1977 | United Kingdom ..................... 403/49 |
| 2133106 | 7/1984 | United Kingdom . |
| 8803212 | 5/1988 | WIPO . |

*Primary Examiner*—Lynne H. Browne
*Assistant Examiner*—John R. Cottingham
*Attorney, Agent, or Firm*—Paul Vincent

[57] ABSTRACT

The invention concerns an assembly for forming a scaffold joint with a transverse brace and posts having at least one projection extending radially with respect to the post axis out from its outer surface, the protrusion having an opening into which a hook disposed on the end of the brace can be introduced from an upper direction, wherein a wedge (47), disposed on the end of the brace, is sufficiently separated from the contours of the hook in its position automatically assumed below the opening (4) subsequent to introduction of the hook (7) into the opening (4) to block motion of the end of the brace in the upward direction through the opening (4), wherein the lower end of the wedge (47) projects in a sideward direction beyond the contours of the hook (7) prior to complete introduction of the hook (7) into the opening and seats on the edge of the opening and, with further introduction of the hook, can be displaced by the edge in the upward direction.

17 Claims, 4 Drawing Sheets

SCAFFOLDING NODE

BACKGROUND OF THE INVENTION

The invention concerns an assembly for the formation of a scaffold joint with transverse braces and posts having at least one protrusion extending radially with respect to the post axis from its outer surface, the protrusion having an opening into which a hook disposed on the end of the brace can be introduced from an upward direction, and a displaceable wedge is disposed on the end of the brace at an acute angle with respect to the post axis, wherein the wedge, following introduction of the hook into the opening, has a separation below the opening from the contour of the hook which is sufficient to block a motion of the end of the brace through the opening in an upward direction (spread position).

Figure 1:
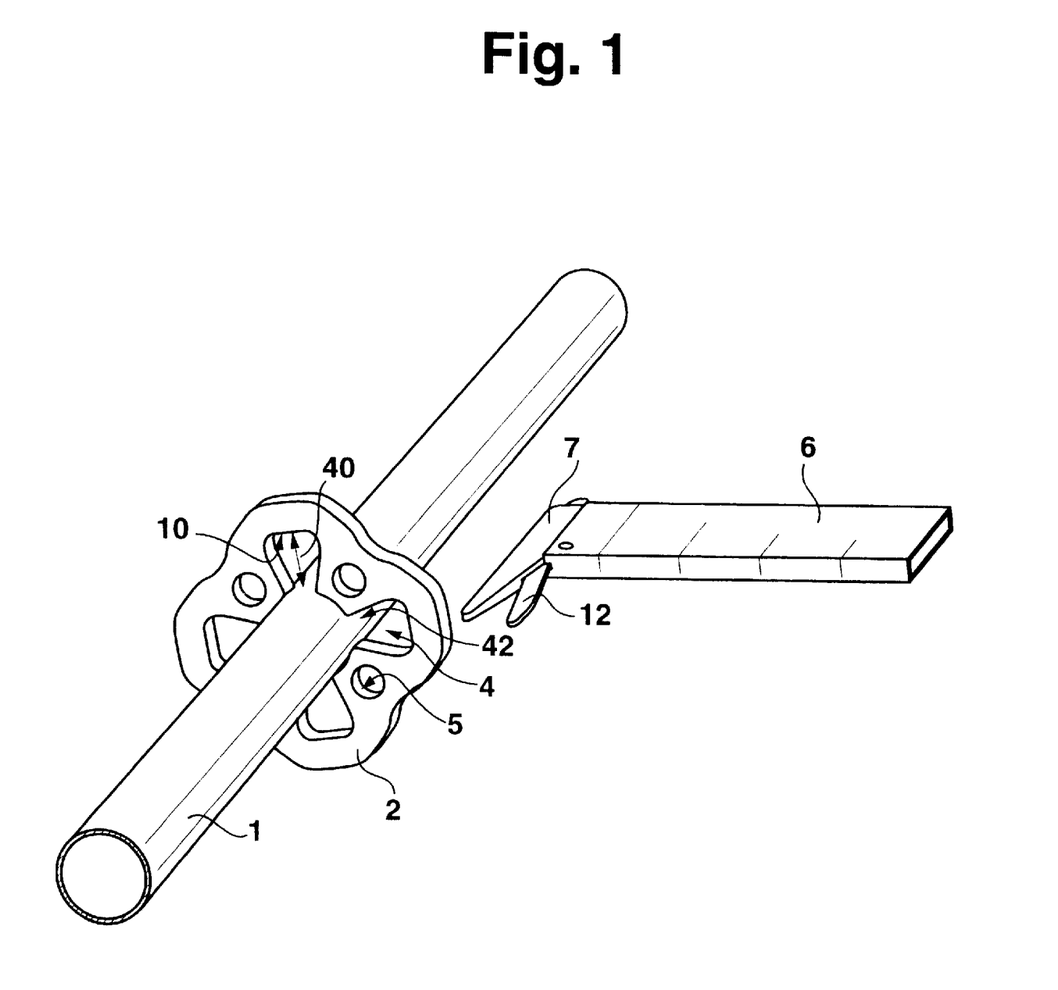
FIG. 1 shows an end of a brace and a section of a post in an embodiment of the invention.

In a scaffold joint of this kind known in the art by means of FIG. 1 of the French patent publication 2 483 994, no abutment surface is present in the path of the front end of the wedge transcribed by the end during penetration of the hook through the opening onto which this end engages to facilitate motion relative to the hook. The hook can only depart from its introduced position when the lower end of the wedge has gained entrance to below the opening of the protrusion. However, it is often the case that the wedge neither leaves its introductory position at this location nor during subsequent further introduction of the hook into the opening, since the resistance within the guiding which guides the wedge in the hook is, in consequence of soiling, so large, that the wedge can no longer automatically protrude beyond the contours of the hook. In this case, this motion of the wedge in its spread position must be initiated or effected by means of a blow on the upper end of the wedge. The separation between the surface facing away from the post of that portion of the hook which is to penetrate into the opening and a surface of the hook designated to abut at the post corresponds approximately to a separation between a front surface of the opening in the protrusion facing the post and the post so that the lower end of the wedge fails to address an abutment surface or a seating surface when introducing the hook into the opening which would hold back the wedge during introduction of the hook into the opening. In addition, this separation from the surface of the post is only slightly larger than the width of the hook including the wedge in its introductory position so that the hook must already seat on the surface of the post when introduced into the opening. This, however, requires that the hook be rather precisely positioned above the opening prior to introduction into the opening which makes its introduction into the opening from the end of the brace lying away from the scaffold joint extremely difficult.

It is therefore the purpose of the invention to improve the conventional scaffold joint to such an extent that its introduction into the opening and thereby the attachment of a brace to a post is substantially simplified compared to the conventional scaffold joint.

SUMMARY OF THE INVENTION

This purpose is achieved in accordance with the invention in that the lower end of the wedge projects beyond the contours of the hook in a sideward direction prior to complete introduction of the hook into the opening so that this end, when introducing the hook into the opening, seats on an edge of the opening and can be displaced in an upward direction during further introduction of the hook.

The invention has the advantage that it is relatively insensitive to soiling. The wedge can already assume its spread position prior to introduction of the brace end into the opening and it is possible for a worker to push same into this position so that the sliding properties of the wedge can be checked and, if necessary, improved. When introducing the hook into the opening, the wedge is then displaced into its uppermost position by a force corresponding to the weight of the brace end. The wedge can move down into its lower position (spread position) after the lower end of the wedge has passed by the front surface of the opening when introducing the hook The brace can be introduced from its end lying away from the scaffold joint from above into the opening at the post, wherein the wedge, in its location (introductory position) which facilitates introduction of the hook into the opening, moves due to its contact with the edge section of the protrusion surrounding the opening. After penetration of the hook through the opening, the wedge moves by itself or by means of pressure or a blow on its upper end into a position in which it is sufficiently separated from the contours of the hook that, in this spread position, the hook and the wedge cannot penetrate through the opening in response to an upward motion and the wedge can only be positioned out of this spread location by means of a force exercised directly on it, e.g. by means of a blow from a hammer, from below and onto the lower end of the wedge. A blow from below acting on the brace cannot move the wedge out of its spread position into its introductory position in which it is no longer separated from the contours of the hook to block an upward motion to possibly, together with the hook, penetrate through the opening in an upward direction and escape therefrom. When the wedge is in the spread position with the end of the brace introduced in the opening only a force exercised from below onto the wedge alone, can cause the wedge to move relative to the hook and leave its spread position.

In embodiments of the invention, the assembly can be arranged in such a fashion that, in the spread position, upward displacement of the wedge is opposed only by its weight and the frictional resistance of its guiding in the hook. Alternatively, a self-locking action occurs between two cooperating sliding surfaces when sliding down the wedge into its spread position which can only be overcome by the previously mentioned upwardly driving force on the wedge.

The angle through which the wedge is spread in its spread position with respect to the surface of the hook facing the post, that is to say, the above-mentioned acute angle, is chosen in such a fashion that the wedge cannot be pushed back from the edge or front surface of the opening in the upward direction under the influence of an upward force acting on the end of the brace. In this fashion, a self-locking action is effected between two mutually cooperating surfaces of the wedge and its guide and/or the front surface of the opening.

When introducing the end of the brace into the opening it is possible for the wedge to move into its spread position after penetration of the lower end of the wedge and hook through the opening due to gravitational force only: in other embodiments of the invention, this motion is supported by means of a spring engaging the wedge.

In an embodiment of the invention, the radial dimension of the length of the opening is larger than the largest radial dimension of that section of the hook which can be inserted into the opening plus the dimension with which the end of the wedge in the uppermost position of the wedge protrudes sidewardly beyond the contours of the hook. In this fashion it is possible for the brace end, during or subsequent to introduction of the hook into the opening, to still be pushed in the radial direction towards the post and, during this pushing or after the brace hook seats, the wedge slides through the opening into its spread position, wherein this motion can be initiated or supported by means of a blow on the upper end surface of the wedge.

In the assembly in accordance with the invention, the worker can initially suspend the brace with the hook in the opening so that the brace, in this position, is already provisionally attached, whereby, if necessary, this section of the scaffold can already be walked upon and subsequent thereto, by pushing the end of the brace towards the post, the wedge falls in a downward direction or, by means of a blow on its upper end, is guided into its spread position to secure the brace at this location. During its introduction into the opening, the hook has an amount of space sufficient to facilitate and simplify this introduction.

In an embodiment of the invention, the hook has a surface for seating on the post at its side facing the post which advantageously travels in the direction of the post axis.

In this embodiment of the invention, when the end of the brace is introduced into the opening at the post, the front surface of the end of the brace is already adjacent to the outer surface of the post. By firm tapping on the wedge from above, the wedge surface seats on the inner edge of the opening facing away from the post and presses the end of the brace towards the post so that, at least at this time, the scaffold joint has the necessary tensile strength, compression strength and stiffness.

The wedge can, however, also be moved in a guided fashion in another manner, e.g. the surface of the wedge can have an eccentric shape or the like.

A self-locking which prevents the edge of the opening from pushing back the wedge into that position facilitating penetration through the opening can be effected by means of seating of various surfaces of the wedge on surfaces of the end of the brace. In an embodiment of the invention, a self-locking between the surface of the inner edge of the opening and the surface of the wedge adjacent thereto occurs. It is also possible for a self-locking effect to be achieved by seating of other surfaces of the wedge on other surfaces of the end of the brace, e.g. by seating of the surfaces of the wedge facing the post on corresponding surfaces of the end of the brace, e.g. also through seating of two separated surfaces which simultaneously serve as guiding surfaces and which, e.g. by striking of the wedge, accept the wedge force generated by the wedge between the edge of the opening rigidly connected to the post and the end of the brace.

Forces, which are exercised by the edge of the opening on the spread apart wedge during attempts to lift the end of the brace with the wedge in the spread-out position thereby increase the connecting strength produced by the self-locking effect so that an upward motion of the end of the brace is not possible.

In embodiments of the invention having a self-locking property, the wedge not only solves the problem of rigidly attaching the end of the brace to the post by means of engagement into an opening on the post rather also solves the problem of preventing the end of the brace from moving out of the opening even when the wedge is not driven into place to the extent that the self-locking occurs independent of whether or not the wedge is firmly seated.

In the spread position, the separation between a section of the edge of the wedge which is furthest from the post and the edge of the hook facing the post is larger than the corresponding dimension between the inner edge of the opening facing the post and the surface defining the opening across from this inner edge. In embodiments of the invention, this section of the edge of the wedge which is furthest from the post is located in the vicinity of its lower end, wherein the lower end can be somewhat tapered in a wedge-like fashion to facilitate penetration through the opening. This section which is furthermost removed from the post in the spread position can, in embodiments of the invention, also be fashioned by a stop protruding from the edge of the wedge facing away from the post, which, when introducing the end of the brace into the opening, abuts with an edge of the opening to push the wedge back into its introductory position facilitating penetration through the opening. When lowering the hook through the opening, the wedge therefore moves relative to the hook into its introductory position with a component of motion approximately at right angles with respect to the edge of the opening from the edge region of the opening into the opening not only in the event that its lower end abuts the edge of the opening rather also in the above-described case.

BRIEF DESCRIPTION OF THE DRAWING

Further features of the invention can be derived from the following description of embodiments in connection with the claims and the drawing. The individual features can be realized individually or collectively in embodiments of the invention.

Embodiments of the invention are represented in the drawings.

DESCRIPTION OF THE PREFERRED EMBODIMENT

In embodiments of the invention shown in FIGS. 1 through 4, a post 1 comprises a pipe having a rounded cross-section to which a rosette 2 is attached by means of weldments 3. In the embodiment shown, the rosette 2 has four openings 4 which extend up to the periphery of the post 1. Holes 5 can also be provided for in the rosette 2 to facilitate attachment of additional scaffold components. A brace 6 which, in the embodiment shown, has a hollow rounded or rectangular shape, connects posts 1 which are disposed vertically at separations from another. A hook 7, which can be made from a wrought-iron component, is attached to the hollow section on the end facing the post 1. The hook 7 has a seating surface 8 on its side facing the post 1 which serves for seating at the periphery of the post 1. The hook 7 has a diagonal or wedge-shaped surface 9 on its side facing away from the post 1 which guides the end of the brace during introduction of the hook 7 from an upward direction into an opening 4. The surface 9 can be configured in such a fashion that it seats on an inner edge 10 of an opening 4 located at the end of the opening 4 facing away from the post 1, when the hook 7 has been completely introduced into the opening 4. The surface 9 could, however, also exhibit a small separation from the inner edge 10 when the end of the brace or hook 7 is completely inserted into the opening 4. In the embodiment of the invention shown, the hook 7 is approximately twice as long as the height of the brace 6 of FIG. 2 so that the seating surface 8 is sufficiently long to guarantee a rigid connection between the post 1 and the brace 6.

The wrought-iron piece constituting the hook 7 is welded or attached in some other fashion to the end of the hollow section of the brace 6 and has a groove 11 travelling from the top towards the bottom, wherein the groove 11 in the embodiment of the invention shown terminates at the diagonal surface 9 at a separation from the end of the hook corresponding approximately to one quarter of the hook length. A wedge 12 is guided in a longitudinally displaceable fashion within this groove 11. In the embodiment shown in FIG. 2, the inner front surface 13 forming the bottom of the groove then provides a guiding surface 14 for the wedge surface 16 and a guiding surface 15 at the upper end of the groove. The longitudinal motion of the wedge 12 is in a direction forming a small acute angle with the plane of the seating surface 8. The wedge 12 seats on the guiding surfaces 14 and 15 with its lower front surface 16 facing the post 1 and with its upper surface 17. The wedge 12 is guided with a clearance in an opening 20 in the lower wall 21 of the brace 6 and in an opening 22 in an upper wall 23 by means of the edge surfaces 18 and 19 opposite to the surfaces 16 and 17.

The wedge 12 has a protrusion 24 at its side facing away from the post 1 having an eye 25 in which a pin 26 can be inserted in a removable manner. An opening 27 is located in the side walls of the brace 6 through which the pin 26 can be introduced into the eye 25.

Figure 2:
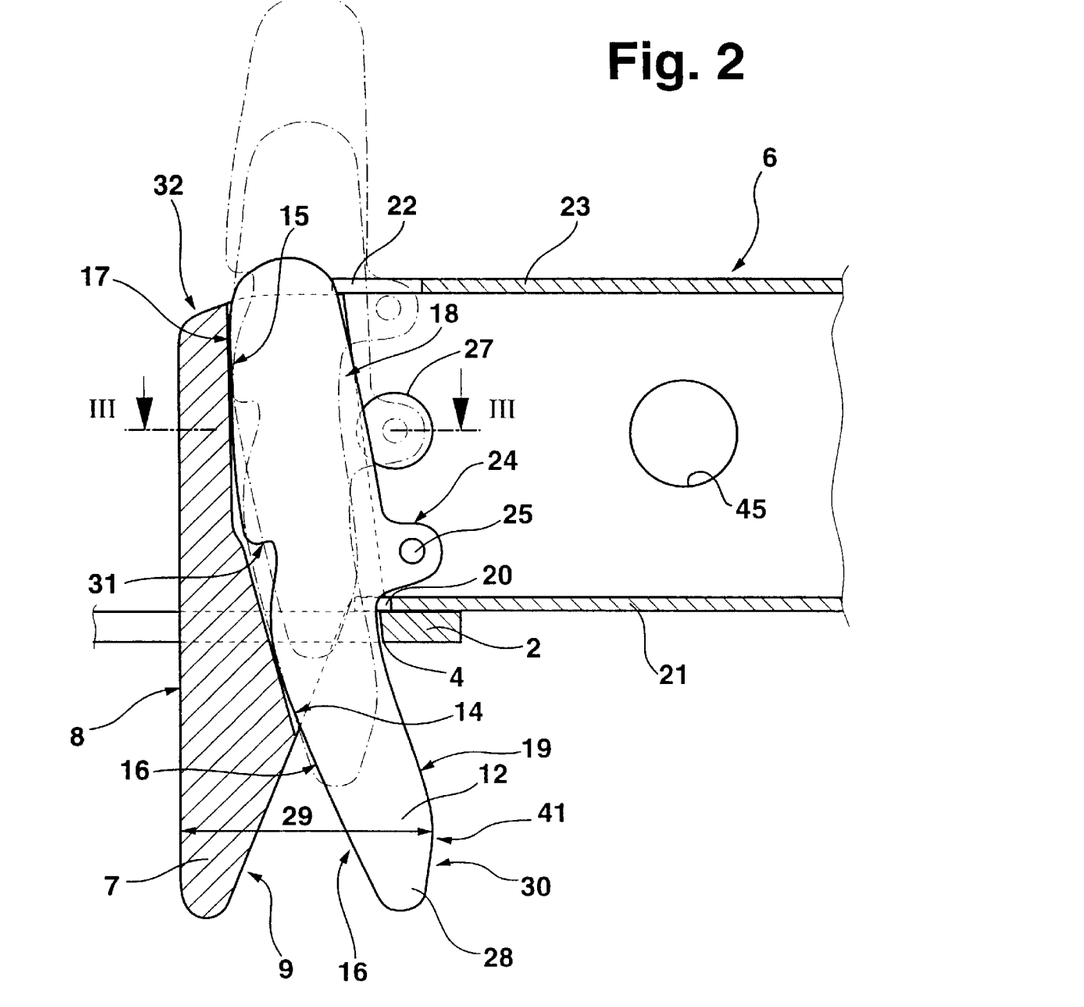
FIG. 2 shows a longitudinal cut through an embodiment of an end of a brace.

The upper opening 22 of FIG. 2 is sufficiently large to allow for the wedge 12 to be pulled upwardly out of the groove 11 when the pin 26 is removed from the eye 25, i.e. the length of the opening is sufficient to allow passage of the protrusion 24.

In the embodiment of the invention shown, the opening 4 is somewhat longer, as viewed in the longitudinal direction of the brace 6, than the width of the hook 7 at that location at which it penetrates through the opening 4 when the lower wall 21 of the brace 6 seats on the rosette 2. When the wedge 12 is pushed in a downward direction with the brace 6 seating on the rosette 2, e.g. through a blow of a hammer, its surface 19 seats on the inner edge 10 of the opening 4 and, since the surfaces 16 and 19 of the wedge 12 taper together in a wedge-shaped fashion, presses via the guiding surfaces 14 and 15 the surface 8 towards the outer wall of the post 1, to thereby rigidly connect the brace 6 and the post 1. In this position, the section with which the wedge surface 16 seats on the guiding surface 14 is below the plane of the opening 4 of the rosette 2. The section 17 at which the upper part of the wedge 12 is pressed onto the guiding surface 15 is situated above the rosette 2.

When the end of the brace 6 is introduced from above into the opening 4, the tip of the hook 7 enters into the opening 4 and the wedge 12, assuming the spread position, protrudes below out of the brace 6 and loosely seats in the guide fashioned by the groove 11 and surfaces 14 and 15. The protrusion 24 can thereby seat on the inner surface of the lower wall 21 of the brace. The opening 20 is, however, not sufficiently large to allow the wedge to fall downwardly out through this opening.

In this spread position, the lower end 28 of the wedge 12 is spread apart from the hook 7. The separation 29 between that section 41 of the side surface 30 of the wedge 12 which is furthermost removed from the surface 8 and this seating surface 8 (functioning for abutment with the post 1) is, in this position, larger than the corresponding dimension 40 (FIG. 1) of the opening 4 of the rosette 2.

When the brace end is then lowered into an opening 4, the lower end of the hook 7 enters into the opening 4 and is guided therein by means of diagonal surface 9 into the proper position. The lower end 28 of the wedge 12 thereby seats on the upper side of the rosette 2 outside of the opening 4 so that the wedge 12, moveable in its guiding, is pushed back in the upward direction. Since this motion occurs at an acute angle with respect to the seating surface 8, the separation 29 is thereby reduced and the lower end 28 gains entrance to the region above the opening 4 so that it no longer seats on the rosette 2. From this position, the wedge 12, in consequence of its weight or by means of a spring force, can slide through the opening 4 in the downward direction until its wedge surface 19 seats on the inner edge of the opening 4. The lower half of the wedge 12 then assumes, as shown in FIG. 2, a spread position in which it is spread apart from the hook 7 so that the separation 29 of the lower end 28 or of the section 41 of the wedge from the seating surface 8 is larger than the corresponding inner dimension 40 of the opening 4. The wedge surface 16 thereby seats on the guiding surface 14 and the wedge surface 17 on the guiding surface 15. The wedge angle is chosen in such a fashion, that a self-locking occurs even in this state between oppositely lying surfaces solely due to the downward fall of the wedge 12 which is sufficient that the inner edge 10 can no longer push the wedge 12 in the upward direction relative to the hook 7 if the brace 6 is lifted, rather remains in its spread out position shown in FIG. 2, in which the end of the brace can no longer pass through the opening 4 since, in this position, the separation 29 is larger than the relevant dimension 40 of the opening 4. Only after the wedge 12 has been struck along its guide in the upward direction through a hammer blow or the like to overcome the spreading out of the lower part of the wedge from the hook 7 (the position shown as the dot-dashed line in FIG. 2), it is possible for the end of the brace to again be removed through the opening 4 in the upward direction out of the rosette 2.

The wedge 12 has a nose 31 on its side facing the seating surface 8 which can be positioned above the upper edge 32 of the hook 7 to hold the wedge 12 in an upper position if required.

The brace 6 can, for purposes of connection of a diagonal brace, also have a hole 45 (FIG. 2) or a welded-on bolt, to which the end of a diagonal brace or the end of two diagonal braces can be attached. It is also possible to have two holes or bolts of this kind disposed adjacent to each other so that an end of a diagonal brace can be attached to each hole or bolt.

Figure 5:
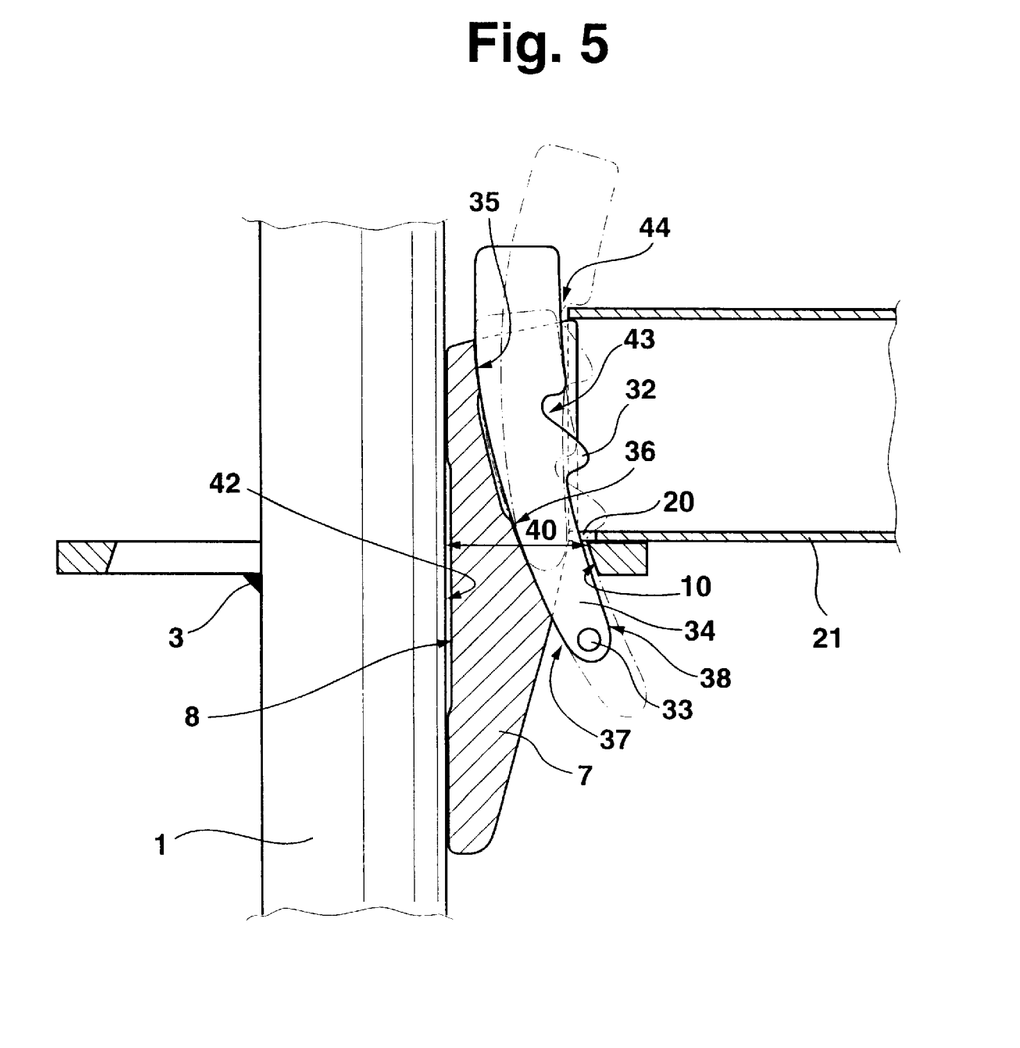
FIG. 5 shows a cross-section corresponding to that of FIG. 2 in another embodiment including the post.

The embodiment of the invention shown in FIG. 5 distinguishes itself from the embodiment shown in FIGS. 1 through 4 in that the wedge 34 has neither an eye 25 at its side facing away from the inner end surface 13 of the groove 11 nor a nose 31 located on its side facing same, and the seating surface 8 protrudes to a certain extent at its upper and lower ends so that the surface 8 does not seat on the outer surface of the post 1 along its entire length when the scaffold joint is secured rather only at an upper and lower section. The wedge 34 has a nose 32 on its side facing away from the seating surface 8 with which the wedge 34 can seat on the inner side of the lower wall 21 above the opening 4, since same overlaps the edge of the lower opening 20 similar to the protrusion 24 in the embodiment of FIG. 2. The wedge 34 can therefore not fall out of the opening 20 in a downward direction. The wedge has an eye 33 at its lower end into which a pin 26 can be secured to also prevent the wedge from falling out through the upper opening 22.

The side surface of the wedge 34 facing the seating surface 8 is curved which, in cooperation with the also slightly curved guiding surfaces 35 and 36 in the bottom of the groove 11, has several advantages with respect to statics as well as with regard to manufacture.

The wedge force produced by the wedge surfaces 37 and 38 when driving the wedge 34 is, in the embodiment of FIG. 5, transferred from the inner edge 10 via the wedge 34 directly onto the surface 36 without having the wedge 34 being exposed to bending stresses, since the surface 36 is located in the plane of the opening 4 when the end of the brace is introduced into the opening 4. The front surface of the inner edge 10 is diagonal in correspondence with the wedge surface 38 so that same seats with as large a surface as possible on the inner edge 10.

In both embodiments, the angle of this diagonal, the travel of the wedge surface 38 adjacent thereto, and the angle of spread are chosen in such a fashion that the wedge cannot be pushed back through the edge 10 of the opening 4 and the spread-out position can only be reversed in the event that the wedge 12, 34 is pushed back relative to the hook 7 by means of a force acting only on it.

In the embodiment according to FIG. 5, the wedge 34 has an additional recess 43 above the nose 32 by means of which the wedge 34, in the position represented in dashed lines in FIG. 5, can be suspended in an upper position on the edge of an opening 44 or on another edge, so that the wedge 34 is held in its guiding position. Departing from this suspended position, the wedge can be pivoted by a force directed towards the post 1 to a sufficient extent to be freed from the edge of the opening 44 and fall in a downward direction into a partially or completely spread position.

In the embodiments shown, a tensile force exercised by the brace 6 on the post 1 is transferred by the hook 7 via the wedge 12, 34 to the inner edge 10 of the opening 4 rigidly connected to the post 1. A compressive force exercised by the brace 6 on the post 1 is transferred to the post via the seating surface 8 or parts thereof. A force acting in the upward direction on the brace 6 is, in the spread position, transferred via the seating of the wedge on the inner edge 10 of the opening 4 to the rosette 2, since the wedge, due to its diagonal position, is held by the edge of the opening. A downward force acting on the brace 6 is transferred to the post 1 via seating of the end of the brace on the rosette 2. This force transfer can be improved to an even further extent if the wrought-iron hook 7 comprises an enlargement on each of its two sides which overlaps the sideward edge of the opening 4 at one or both sides in the position of seating on the rosette 2, to thereby form an additional seating surface. A torque exercised by the brace 6 on the post 1 in the upward direction, is transferred to the rosette 2 through seating of the wedge 12, 34 on the front surface of the groove 11 of the hook 7 as well as seating of the wedge on the inner edge 10 of the opening 4 and transferred to the seating surface 42 (FIG. 1) of the post through seating of the seating surface 8 on the upper end of the hook 7. A torque acting to pivot the brace 6 in a downward direction is transferred to the rosette 2 through seating of the lower end of the hook 7 on the seating surface 42 of the post 1 and by seating of the wedge 12, 34 on the inner edge of the opening 4, wherein the wedge supports the hook 7 via the inner front surface of the groove 11.

In the embodiments of the invention shown, the section 41 which is furthermost removed from the surface 8 is proximate to the lower end of the wedge 12, 34. The separation 29 determines the spreading-out and thereby the spread-out angle as well as the blocking action of the wedge with respect to upward motion through the opening 4. Such a section 41 most distant from the surface 8 can, however, also be provided for somewhat further upwardly on the wedge surface 19 or 38. It then constitutes a stop at its lower side which seats on the edge of the opening when introducing the hook 7 into the opening 4 to guide the wedge back into its introductory position in which this protrusion 41 can pass through the opening 4 and the wedge 12, 34 moves in its spread position in which the separation of the section 41 forming a protrusion from the seating surface 8 is larger than the longitudinal dimension 40 of the opening 4.

In the embodiments shown, the spread out between the hook 7 and the wedge 12, 34 is radial relative to the post axis. This spread out can, however, be in other directions in other embodiments, e.g. transverse to the radius of the post. Important is only that, when introducing the hook into the opening from the upper direction, the lower end of the wedge or of a protrusion extending from the wedge abuts the edge of the opening or the surface of the rosette so that the wedge is thereby moved into its introductory location at which it can pass through the opening 4 along with the hook.

In the embodiments shown, the opening 4 is defined at its end adjacent to the post by a seating surface 42 located on the periphery of the post. This has certain advantages from a statics as well as from a manufacturing standpoint. Clearly, the opening 4 can also be defined by a wall section also located in the rosette 2 at the side neighbouring the post 1.

In the embodiment of the invention shown in FIG. 5, the distance between the nose 32 and the upper end of the wedge 34 is sufficiently large at that location at which the nose 32 seats on the inner surface of the wall 21 of the brace 6, (i.e. in the spread-out position with the upper end of the wedge 34, as shown in FIG. 5, either within the opening 44 or extending somewhat upwardly beyond same) to prevent the wedge from pivoting in the clockwise direction of FIG. 5.

Figure 3:
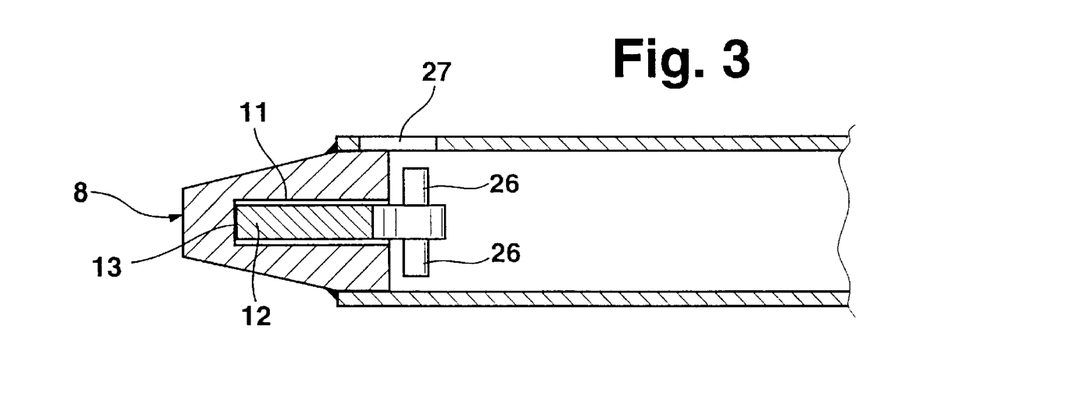
FIG. 3 shows a cut according to line III—III of FIG. 2.
Figure 4:
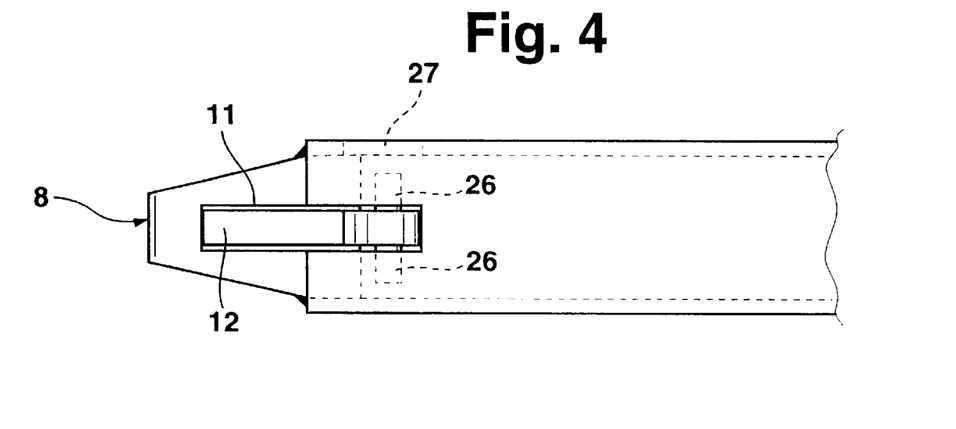
FIG. 4 shows a plan view of an embodiment of an end of a brace.
Figure 6:
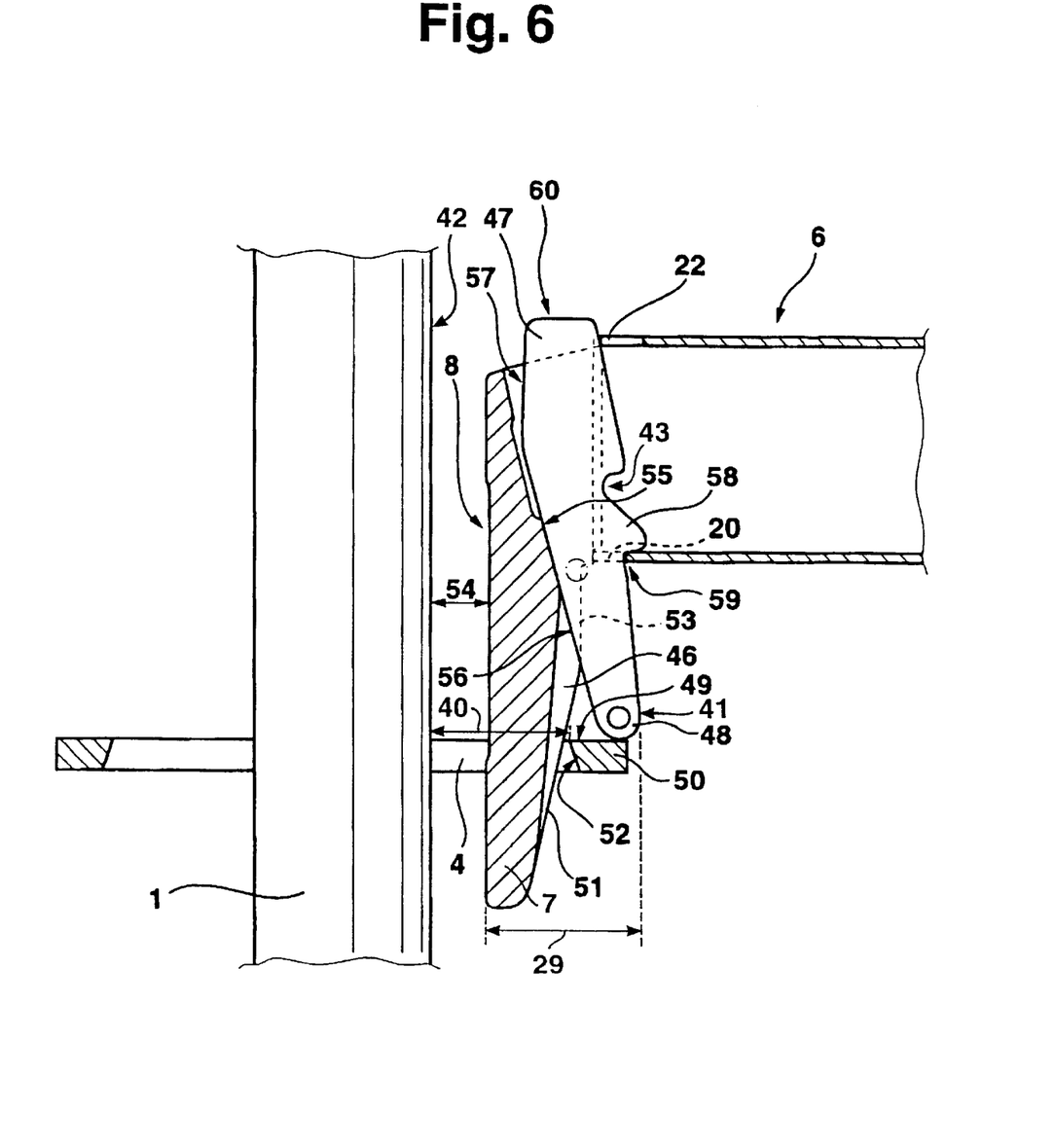
FIG. 6 shows a cross-section corresponding to that of FIG. 5 of a third embodiment.

In the embodiment of the invention shown in FIG. 6, the groove 46 corresponding to the groove 11 of FIGS. 2 and 3 is fashioned in such a manner that the lower end 48 of the wedge is located somewhat outside of the groove 46 when the wedge is in its fully upwardly displaced position: this is not the case for the other embodiments in accordance with FIGS. 2 and 5. In these embodiments, the lower end of the wedge completely disappears in the raised position (introductory position), within the groove with the slanted surface 9 of the hook seating on the edge of the opening 4 to push the edge towards the post 1. However, in this introductory position, a certain amount of play remains between the hook 7 and the edge of the opening 4 and/or there is a gap between the seating surface 42 of the post 1 and the seating surface 8 of the hook 7. This play or this gap disappears when the wedge 12 or 34 is firmly hammered in the spread-out position.

In the embodiment shown in FIG. 6, the wedge 47 is pushed upwardly in the groove 46 of the hook 7 when introducing the hook 7 into the opening 4 but, as is the case above, does not completely disappear in the raised position (introductory position) within the groove 46, rather its lower end remains on the upper surface 49 of the edge 50 of the opening 4, since it is somewhat displaced out of the groove 46 when the slanted surface 51 of the hook 7 still seats on the inner end surface 52 of the opening 4. This slanted surface 51 is no longer wedge-shaped in its upper section 53, rather is largely parallel to the seating surface 8 of the hook 7. In this position in which the section 53 of the slanted surface 51 seats on the inner front surface 52 of the opening 4, a gap 54 remains which is larger than the dimension by which the lower end 48 of the wedge 47 protrudes out of the groove 46 at this position. The brace 6 is then pushed towards the post 1 so that the lower end 48 of the wedge 47 is freed from the surface 49 of the edge 50 and moves above the opening 4 and the wedge 47 can fall out of this position through the opening 4 to assume its spread position.

The dimensions can be chosen in such a fashion that the seating surface 8 already seats on the outer surface of the post 1 before the lower end 48 of the wedge 47 completely assumes its spread position, whereupon the wedge can then be firmly struck. The dimensions can, however, also be chosen in such a fashion that falling through of the end of the wedge 48 through the opening 4 into its completely spread position can already take place before the space 54 completely disappears when the brace 6 is pushed towards the post 1. Blows of a hammer exercised on the hook lead to firm attachment of the end of the brace in the embodiment according to FIGS. 2 and 5. The shape of the wedge 47 differs from the shape of the wedge 12 in FIG. 2 and 34 in FIG. 5 as can be seen by comparison of the drawings. However, the embodiment of FIG. 6 also provides that, in the spread position, a force exercised by the inner surface 52 of the opening 4 on the wedge 47 is directly transferred to the inner front surface of the groove 46.

The surface 56 facing the post 1 is largely flat and has a bend in its upper half to which a flat surface 57 is adjacent. The wedge 47 has a nose 58 on the side facing away from the post 1, which seats on the edge 59 of the opening 20 in the neutral position when the end of the brace and the hook 7 are not inserted into the opening 4 to thereby prevent the wedge 47, in this spread position, from falling through the opening 20. The dimensions are thereby chosen in such a fashion that, in this position, the upper end 60 of the wedge 47 projects upwardly out of the upper opening 22.

I claim:

1. A scaffold joint assembly comprising:

a post having a protrusion mounted thereto, said protrusion extending radially away from an outer surface of said post, said protrusion having an opening;

a brace having a hook mounted thereto, said hook having a first surface facing and extending substantially parallel to said outer surface of said post, said hook having second surface opposite said first surface, said second surface slanting in an upward direction toward said outer post surface, said hook also having a third surface adjacent to said second hook surface and opposite and substantially parallel to said first hook surface; and a wedge having a first surface cooperating with said second hook surface to slide said wedge along said second hook surface in an upward direction when said hook is initially lowered from above into said opening, said first wedge surface slanting downwardly away from said outer surface of said post in a lower locking position of said wedge, said wedge having a second surface adjacent said first hook surface and extending in a substantially vertical direction in contact with said third hook surface in said lower locking position of said wedge, whereby a lower end of said wedge seats on said protrusion adjacent to said opening when introducing said hook into said opening, is displaced upwardly when said hook is further lowered into said opening, and then moves downwardly through said opening and pivots away from said post to firmly seat said wedge in said opening for blocking an upward movement of said brace.

2. The assembly of claim 1 wherein said opening has a radial length which is larger than a first radial dimension of a section of the hook lying within said opening when the brace is attached to the post plus a second dimension by which said lower wedge end protrudes radially away from said second surface of said hook in a most upward location of said wedge.

3. The assembly of claim 1, wherein said wedge comprises means retaining said wedge against sliding in a downward direction relative to an end of the brace before said hook is introduced into said opening.

4. The assembly of claim 1, wherein said hook has a fourth surface adjacent to said second hook surface cooperating with an inner surface of said opening to displace the brace towards the post when said hook passes through said opening.

5. The assembly of claim 1, wherein said wedge slides under the force of gravity along said second hook surface to pass through said opening.

6. The assembly of claim 1, wherein said opening, said wedge and said hook are dimensioned to hold said wedge via frictional forces within said opening in opposition to upward motion.

7. The assembly of claim 6, wherein an outer surface of said wedge seats on an inner edge of said opening to lock said wedge against an upward motion thereof.

8. The assembly of claim 1, wherein said opening, said wedge and said hook are dimensioned to hold said wedge in opposition to a pivoting motion.

9. The assembly of claim 1, wherein said hook has a groove within which said wedge is guided.

10. The assembly of claim 1, wherein the brace has a groove for guiding said wedge.

11. The assembly of claim 1, wherein said wedge is held in a permanent fashion within an end of the brace.

12. The assembly of claim 11, wherein the brace has a hollow section and said wedge has a protrusion which seats on an inner surface of a wall of the hollow section when said wedge is moved relative to an opening in the wall.

13. The assembly of claim 12, wherein said wedge has an opening into which a transverse bolt can be introduced in a removable fashion when said wedge is within said hollow section and a second wall of the hollow section has an opening to introduce said transverse bolt into said opening of said wedge.

14. The assembly of claim 1, wherein said wedge is held in the brace in a detachable fashion prior to an introductory position of said wedge.

15. The assembly of claim 14, wherein said wedge has a recess to hold said wedge on an edge of the brace when said wedge is in a raised position.

16. The assembly of claim 1, further comprising means to hold said wedge against pivoting into an inner volume of the brace.

17. A scaffold joint assembly comprising:

a post having a protrusion mounted thereto, said protrusion extending radially away from an outer surface of said post, said protrusion having an opening;

a brace having a hook mounted thereto, said hook having a first surface facing and extending substantially parallel to said outer surface of said post, said hook having a second surface opposite said first surface, said second surface slanting in an upward direction toward said outer post surface, said brace having a hollow section comprising a lower wall having an opening and an inner surface and a side wall having an opening; and a wedge having a first surface cooperating with said second hook surface to slide said wedge along said second hook surface in an upward direction when said hook is initially lowered from above into said opening, wherein said wedge is held in a permanent fashion within an end of said brace, said wedge comprising a protrusion seating on said inner surface of said lower wall of said hollow section before said hook is inserted into said post protrusion opening, said wedge also having an opening into which a transverse bolt can be introduced in a removable fashion through said opening in said second wall when said wedge is within said hollow section.

* * * * *